United States Patent
Liao

(10) Patent No.: US 6,336,625 B1
(45) Date of Patent: Jan. 8, 2002

(54) ADJUSTABLE SHOCK ABSORBER MOUNTING STRUCTURE

(76) Inventor: Tsai-Tien Liao, No. 36, Lane 320, Teming Rd., Taiping City, Taipei County (TW)

(*) Notice: Subject to any disclaimer, the term of this patent is extended or adjusted under 35 U.S.C. 154(b) by 0 days.

(21) Appl. No.: 09/648,481

(22) Filed: Aug. 28, 2000

(51) Int. Cl.⁷ .............................................. B60G 25/00
(52) U.S. Cl. .......................... 267/66; 29/227; 254/10.5; 73/11.04
(58) Field of Search ................................ 267/218, 220, 267/64.11, 66, 68; 29/225, 227; 254/10.5; 73/11.04, 11.07, 11.08; 248/560, 562, 636, 638, 656

(56) References Cited

U.S. PATENT DOCUMENTS

| | | | | |
|---|---|---|---|---|
| 4,219,918 A | * | 9/1980 | Klann | 29/227 |
| 5,172,462 A | * | 12/1992 | Ha | 29/227 |
| 5,680,686 A | * | 10/1997 | Bosche et al. | 29/227 |
| 6,129,339 A | * | 10/2000 | Lundgreen et al. | 254/10.5 |

* cited by examiner

Primary Examiner—Pam Rodriguez
(74) Attorney, Agent, or Firm—Rosenberg, Klein & Lee

(57) ABSTRACT

A shock-absorber mounting structure includes a base frame holding two parallel rails vertically, a top carrier and a bottom carrier moved along the parallel rails in the base frame, a screw rod rotated by a hand wheel to move the top carrier along the rails relative to the bottom carrier, a hydraulic system controlled to move the bottom carrier along the rails relative to the top carrier, and two shock-absorber holders respectively installed in the top carrier and the bottom carrier and adapted to hold a shock absorber therebetween.

2 Claims, 8 Drawing Sheets

ADJUSTABLE SHOCK ABSORBER MOUNTING STRUCTURE

BACKGROUND OF THE INVENTION

The present invention relates to an adjustable shock-absorber mounting structure for holding a shock-absorber, and more particularly to such an adjustable shock-absorber mounting structure, which is safe in use and, can easily rapidly be installed with less effort.

FIG. 1 shows a shock-absorber mounting structure holding a shock absorber according to the prior art. This design of shock-absorber mounting structure comprises a bottom frame 111, the bottom frame 111 comprising two fixed holder blocks 120 and 130 at the top side thereof, an upright tube 140 mounted on the top side of the bottom frame 111 at the center between the fixed holder blocks 120 and 130, a screw rod 171 supported in the upright tube 140, a movable sleeve 152 mounted on the upright tube 140 and moved axially relative to the upright tube 140 upon rotation of the screw rod 171, the movable sleeve 152 having two lugs 151 disposed at two opposite sides at different elevations, and two U-shaped catch pawls D respectively fastened to the lugs 151, and two hydraulic cylinders 1 respectively installed in the holder blocks 120 and 130 (only one hydraulic cylinder is shown in FIG. 1). When in use, shock absorbers 101 are respectively mounted between the hydraulic cylinders 1 and the catch pawls D. By means of rotating the head 172 of the screw rod 171, the movable sleeve 152 is moved vertically along the upright tube 140 to compress/release the shock absorbers 101. The shock absorbers 101 commonly comprise a spring 4 or 6, a top end cap 5 fastened to one end of the spring 4 or 6 and a bottom end cap 2 fastened to the other end of the spring 4 or 6. This design of shock-absorbing mounting structure is not satisfactory in function. The drawbacks of this design of shock-absorbing mounting structure are numerous and outlined hereinafter.

1. When loosening the lock nut 7 of the shock absorber 101 in order to remove the shock absorber 101, the spring 4 or 6 may jump out of place suddenly, causing an accident. In order to eliminate this problem, the spring 4 or 6 must be positively held in place when loosening the lock nut 7.
2. Because the bottom end cap 2 of the shock absorber 101 is not positively secured in place, the shock absorber 101 tends to be erroneously twisted or forced out of place during installation.
3. The U-shaped catch pawls D cannot fit all kinds of shock absorbers. Because the springs of conventional shock absorbers have different diameters or shapes (see FIGS. 2A and 2B), the fixed size of the catch pawls D cannot fit different structures of shock absorbers.
4. When adjusting the elevation of the movable sleeve 152, a hand tool must be used to rotate the head 172 of the screw rod 171.
5. This design of shock-absorber mounting structure has no means for mounting on a support, for example, the wall, worktable, or any of a variety of equipment.

SUMMARY OF THE INVENTION

The invention has been accomplished to provide a shock-absorbing mounting structure, which eliminates the aforesaid drawbacks. According to one aspect of the present invention, the shock-absorber mounting structure comprises a base frame holding two parallel rails vertically, a top carrier and a bottom carrier moved along the parallel rails in the base frame, a screw rod rotated by a hand wheel to move the top carrier along the rails relative to the bottom carrier, a hydraulic system controlled to move the bottom carrier along the rails relative to the top carrier, and two shock-absorber holders respectively installed in the top carrier and the bottom carrier and adapted to hold a shock-absorber therebetween. According to another aspect of the present invention, the hydraulic system comprises a hydraulic cylinder, the hydraulic cylinder having a reciprocating rod fixedly connected to the bottom carrier and adapted to move the bottom carrier along the rails relative to the top carrier, an oil pipe connected to the hydraulic cylinder for return flow of hydraulic fluid from the hydraulic cylinder, a relief valve installed in the oil pipe for release of air from the oil pipe, and a hand pump adapted to pump hydraulic fluid out of the oil pipe to the hydraulic cylinder to lift the reciprocating rod. According to still another aspect of the present invention, the shock-absorber holders are replaceable, and different structures of shock-absorber holders can be used to fit different shock-absorbers. According to still another aspect of the present invention, the base frame has a back mounting board adapted for fastening to a support.

DETAILED DESCRIPTION OF THE PREFERRED EMBODIMENT

Figure 1:
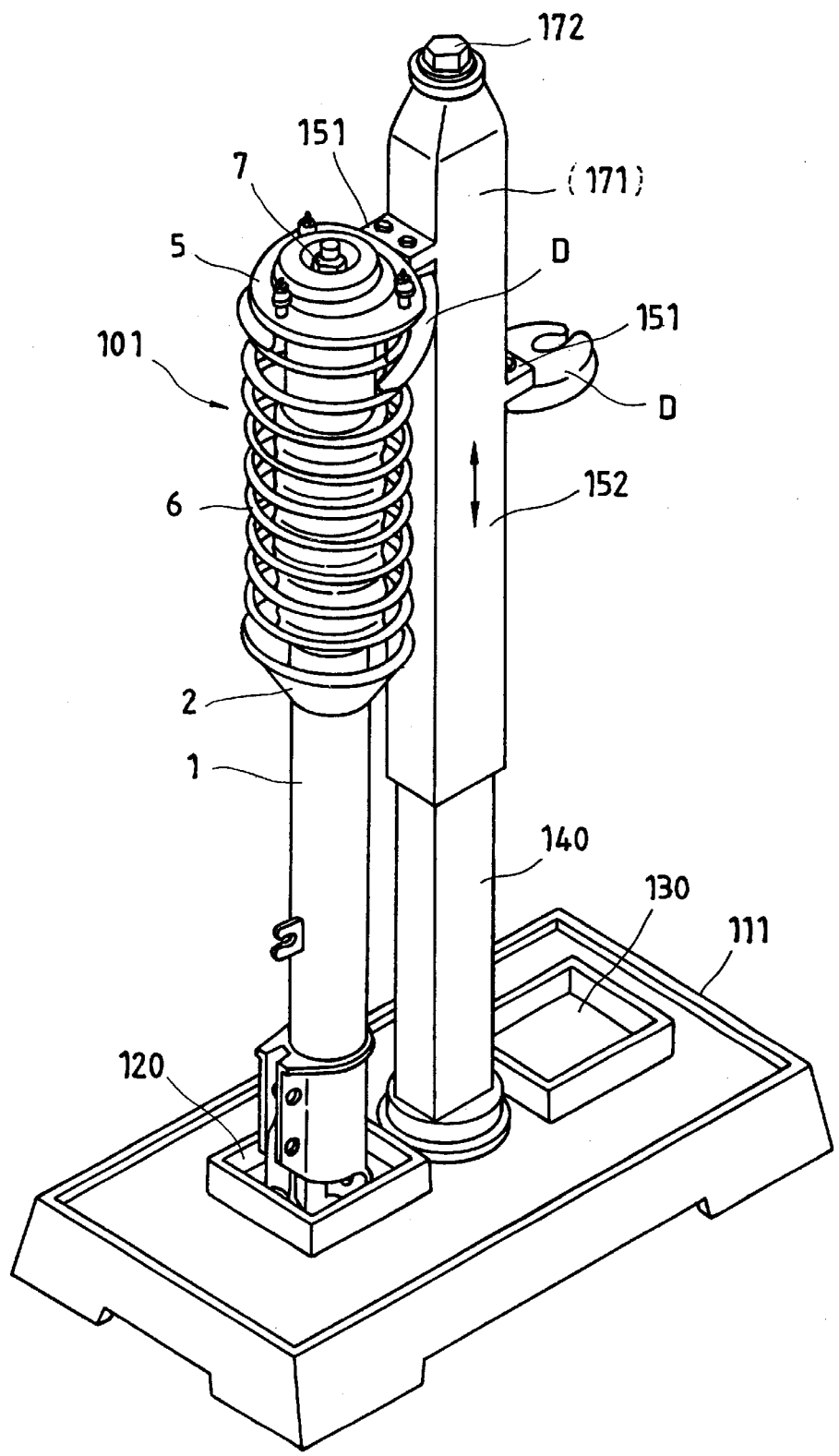
FIG. 1 illustrates a shock-absorber mounting structure and a shock absorber installed in the shock-absorber mounting structure according to the prior art.
Figure 2A:
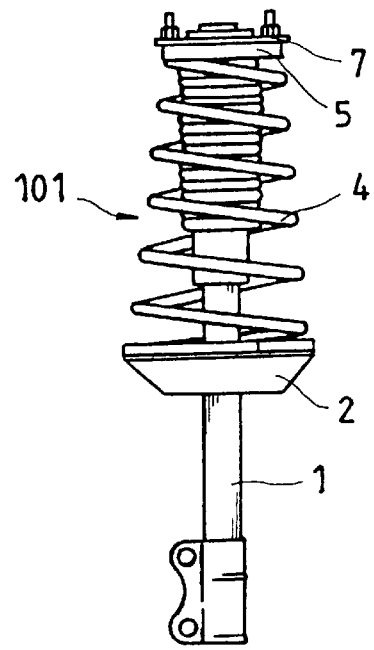
FIG. 2A is a perspective view of a regular shock absorber.
Figure 2B:
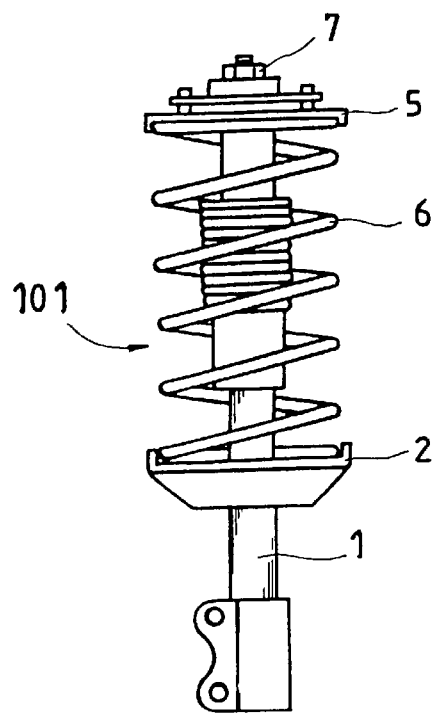
FIG. 2B is a perspective view of another structure of shock absorber.

Referring to FIGS. from 3 through 5 and 10, the present invention comprises a base frame 10, the base frame 10 having two longitudinal sliding slots 13 aligned at two opposite vertical side walls thereof, two parallel rails 12 longitudinally mounted in the base frame 10, a screw rod 11 longitudinally mounted in the base frame 10 between the rails 12, a hand wheel 110 fixedly fastened to the screw rod 11 above the base frame 10 and adapted to rotate the screw rod 11, an upper carrier 20 adapted to move alone the rails 12 upon rotation of the screw rod 11, the upper carrier 20 having a center screw hole 201, which receives the screw rod 11, a bottom carrier 24 adapted to move along the rails 12 below the upper carrier 20, the bottom carrier 24 having a center through hole 241 for the passing of the screw rod 11 and two rod members 240 horizontally extended from two opposite lateral sides thereof and respectively inserted through the sliding slots 13 of the base frame 10, a hydraulic cylinder 16 provided below the base frame 10, the hydraulic cylinder 16 having a bottom shell 161 and a reciprocating rod 160 fixedly connected to the bottom carrier 24 and adapted to move the bottom carrier 24 along the rails 12 relative to the upper carrier 20, two return springs 17 bilaterally connected between two distal ends of the bottom shell 161 of the hydraulic cylinder 16 and the rod members 240 of the bottom carrier 24 to impart a downward pressure to the bottom carrier 24, an oil pipe 150 connected to the hydraulic cylinder 16, a relief valve 15 installed in the oil pipe 150, a hand pump 14 connected to one end of the oil pipe 150 remote from the hydraulic cylinder 16, and shock-absorber holders 300 installed in the upper carrier 20 and the bottom carrier 24. The hand pump 14 has a handle 141 for operation by hand to pump hydraulic oil out of the oil pipe 150 into the hydraulic cylinder 16, causing the reciprocating rod 160 of the hydraulic cylinder 16 to lift the bottom carrier 24. The upper carrier 20 and the bottom carrier 24 each comprise a receiving chamber 21 and a plurality of mounting holes 22. Lock pins 23 are installed in the mounting holes 22 to secure a shock-absorber holder 300 to the receiving chamber 21 of the carrier 20 or 24. The shock-absorber holder 300 may be variously embodied. In the drawings, there are shown four different shock-absorber holders 300a, 300b, 300c and 300d. The first shock-absorber holder 300a comprises an arched connecting plate 32, the arched connecting plate 32 having a longitudinal series of mounting holes 33, and two arms 30 bilaterally coupled between the arched connecting plate 32 and the carrier 20 or 24. The arms 30 each have an eyelet-like rear end adapted for inserting into the receiving chamber 21 of the carrier 20 or 24 and connecting to the mounting holes 22 of the carrier 20 or 24 by a lock pin 23, a front end selectively fastened to one mounting hole 33 of the arched connecting plate 32, and hooked lugs 31 disposed at an inner side near the front end. The second shock-absorber holder 300b comprises two arms 40, the arms 40 each having an eyelet-like rear end adapted for inserting into the receiving chamber 21 of the carrier 20 or 24 and connecting to the mounting holes 22 of the carrier 20 or 24 by a lock pin 23 and a headed front end provided with a plurality of vertically spaced mounting holes 41, and two swivel catch pawls 42 selectively fastened to the mounting holes 41 of the arms 40 by lock nuts or the like. The third shock-absorber holder 300c comprises two arms 50, the arms 50 each having an eyelet-like rear end adapted for inserting into the receiving chamber 21 of the carrier 20 or 24 and connecting to the mounting holes 22 of the carrier 20 or 24 by a lock pin 23, two stems 51 vertically adjustably fastened to the arms 50 and fixed at the desired elevation by tightening up screws or the like, and two catch pawls 52 respectively mounted on the stems 51. The fourth shock-absorber holder 300d is comprised of a substantially U-shaped catch pawl 60.

Figure 4:
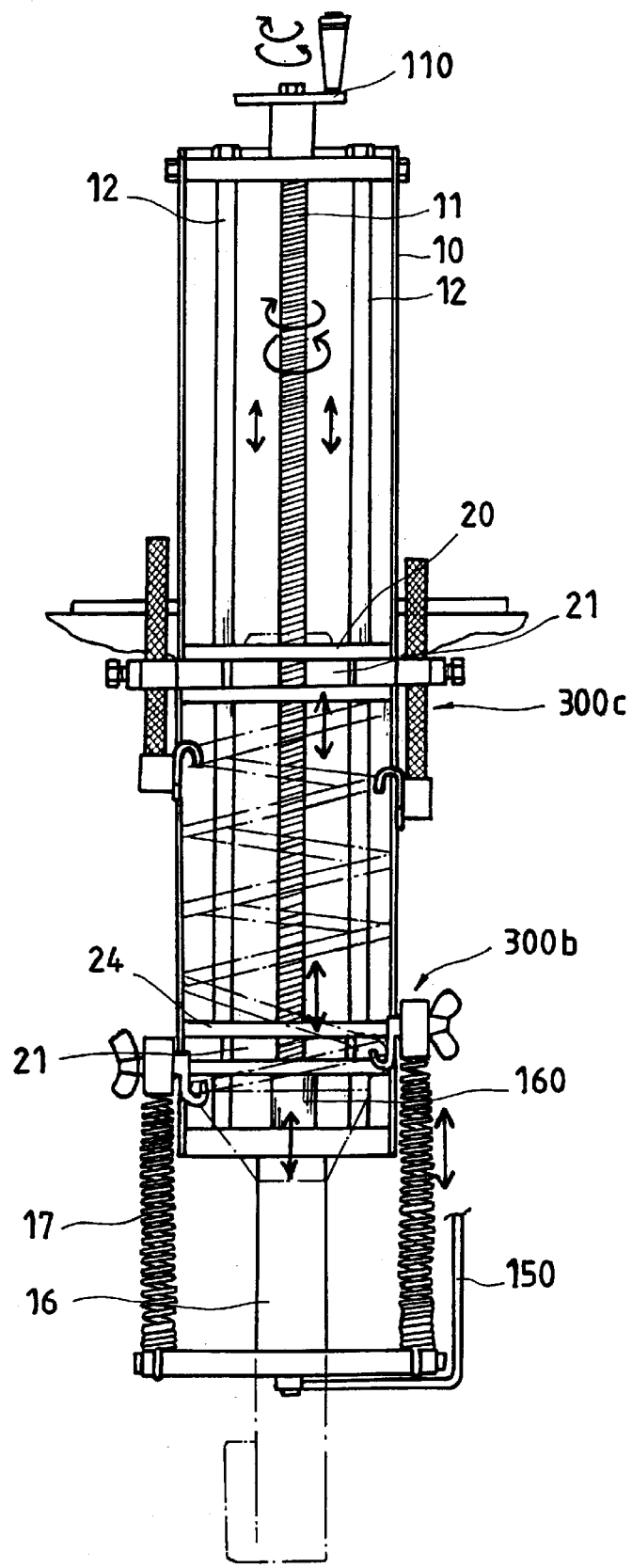
FIG. 4 is a schematic drawing showing the top carrier and the bottom carrier moved relative to each other along the rails.
Figure 9:
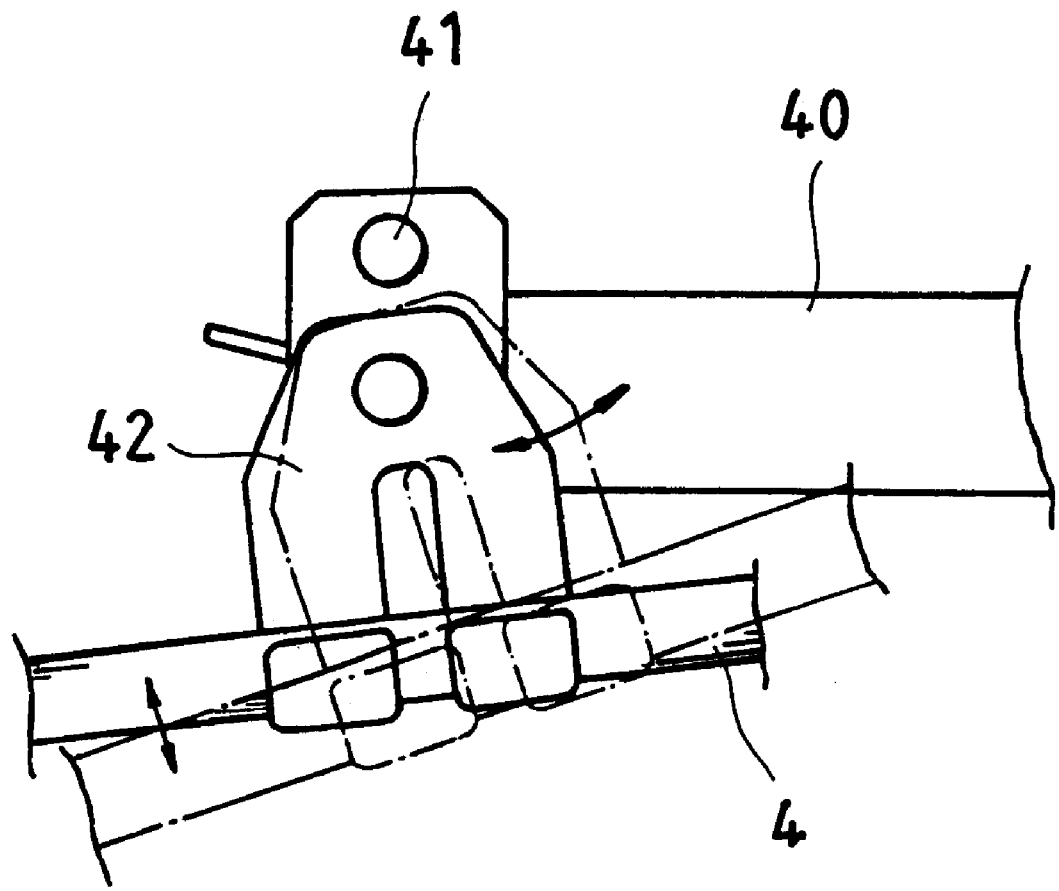
FIG. 9 is a schematic drawing showing the angular position of the swivel catch pawl of the second shock-absorber holder adjusted.

Referring to FIG. 9 and FIGS. 4 and 5 again, when in use, the hand wheel 110 is rotated to move the upper carrier 20 upwardly along the rails 12, leaving the distance between the upper carrier 20 and the bottom carrier 24 to be slightly greater than the distance between the top end cap 5 and bottom end cap 2 at two distal ends of the spring 6 of the shock-absorber, and then the shock-absorber is inserted in between the shock-absorber holder 300 at the upper carrier 20 and the shock-absorber holder 300 at the bottom carrier 24, and then the handle 141 of the hand pump 14 is operated to pump hydraulic oil out of the oil pipe 150 into the hydraulic cylinder 16, causing the reciprocating rod 160 to lift the bottom carrier 24, and therefore the shock-absorber is compressed between the shock-absorber holder at the upper carrier 20 and the shock-absorber holder 300 at the bottom carrier 24. After the shock absorber has been positively positioned between the shock-absorber holder at the upper carrier 20 and the shock-absorber holder 300 at the bottom carrier 24, the relief valve 15 can be opened to release air pressure, enabling hydraulic oil to flow back from the hydraulic cylinder 16 into the oil pipe 150. When hydraulic oil flowed out of the hydraulic cylinder 16 into the oil pipe 150, the bottom carrier 24 is pulled downwards to its former position by the return springs 17, and the shock-absorber is allowed to be taken away.

Figure 5:
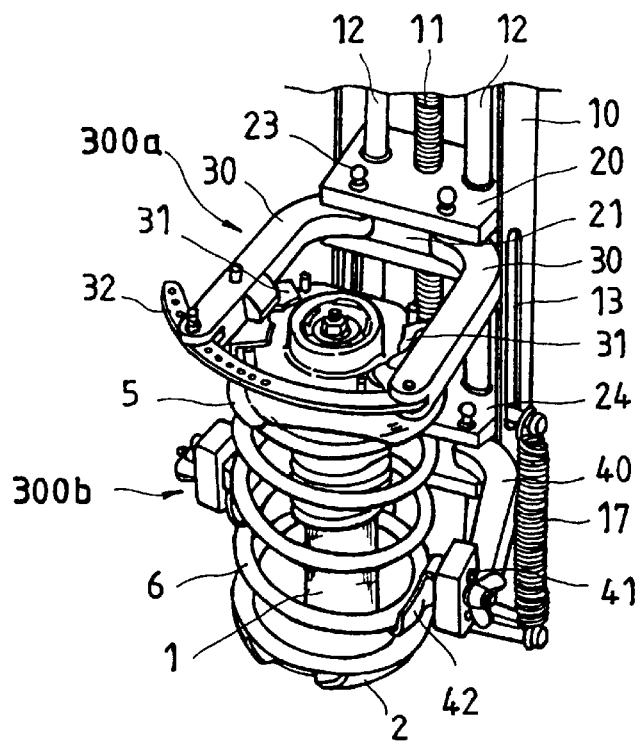
FIG. 5 is a perspective view showing an application example of the present invention.
Figure 6:
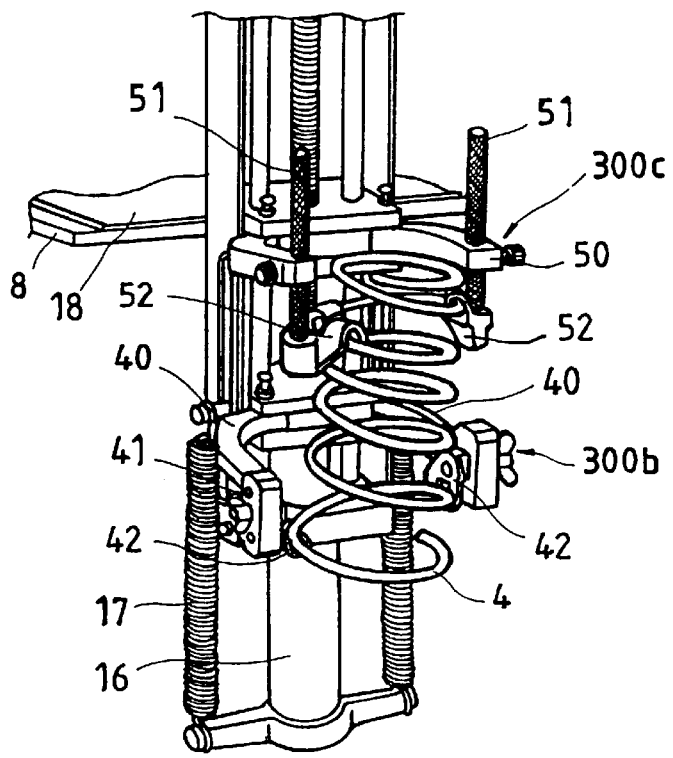
FIG. 6 is a perspective view showing another application example of the present invention.
Figure 7:
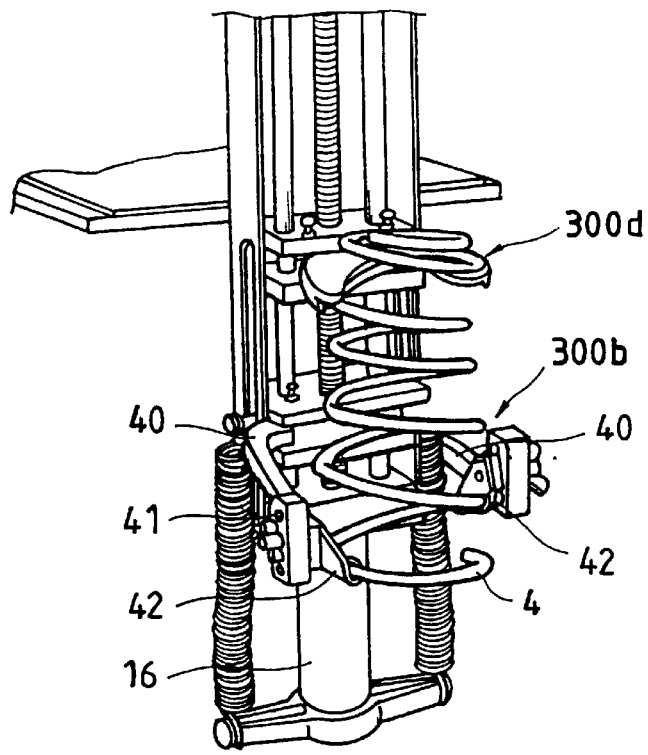
FIG. 7 is a perspective view showing still another application example of the present invention.
Figure 8:
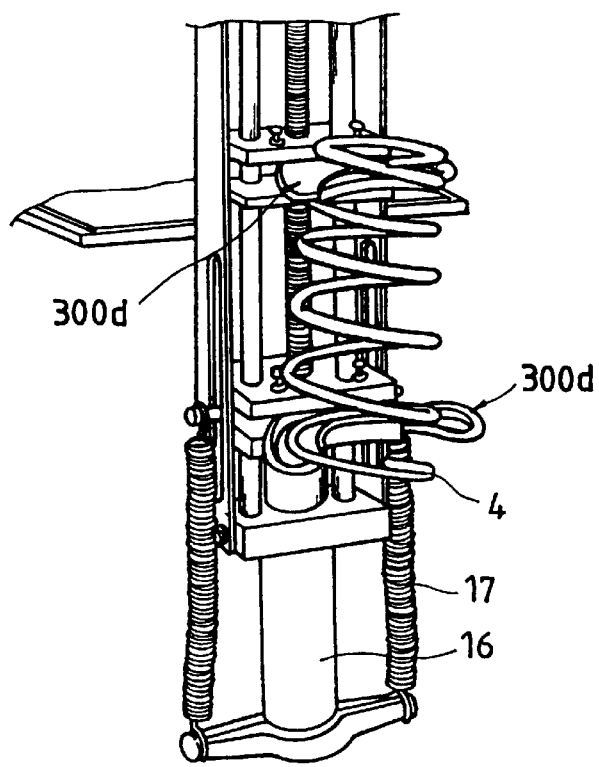
FIG. 8 is a perspective view showing still another application example of the present invention.

FIGS. from 5 through 8 show various different application examples of the shock-absorber holders 300. In FIG. 5, one first shock-absorber holder 300a and one second shock-absorber holder 300b are respectively installed in the upper carrier 20 and the bottom carrier 24 to hold a shock-absorber, enabling the top end cap 5 and bottom end cap 2 of the shock-absorber to be respectively secured to the hooked lugs 31 of the first shock-absorber holder 300a and the swivel catch pawls 42 of the second shock-absorber holder 300b. In FIG. 6, one third shock-absorber holder 300c and one second shock-absorber holder 300b are respectively installed in the upper carrier 20 and the bottom carrier 24 to hold a conical spring type shock-absorber 4, and the conical spring type shock-absorber 4 is fastened to the catch pawls 52 of the third shock-absorber holder 300c and the swivel catch pawls 42 of the second shock-absorber holder 300b. In FIG. 7, one fourth shock-absorber holder 300d and one second shock-absorber holder 300b are respectively installed in the upper carrier 20 and the bottom carrier 24 to hold a conical spring type shock-absorber 4, and the conical spring type shock-absorber 4 is fastened to U-shaped catch pawl 60 of the fourth shock-absorber holder 300d and the swivel catch pawls 42 of the second shock-absorber holder 300b. In FIG. 8, two fourth shock-absorber holders 300d are respectively installed in the upper carrier 20 and the bottom carrier 24 to hold a conical spring type shock-absorber 4, and the conical spring type shock-absorber 4 is fastened to the U-shaped catch pawl 60 of the fourth shock-absorber holder 300d at the upper carrier 20 and the U-shaped catch pawl 60 of the fourth shock-absorber holder 300d at the bottom carrier 24.

Referring to FIG. 9 again, the swivel catch pawl 42 can be rotated in the selected mounting hole 41 of the respective arm 40 and then locked in the desired angle.

Figures 3, 3A, 3B:
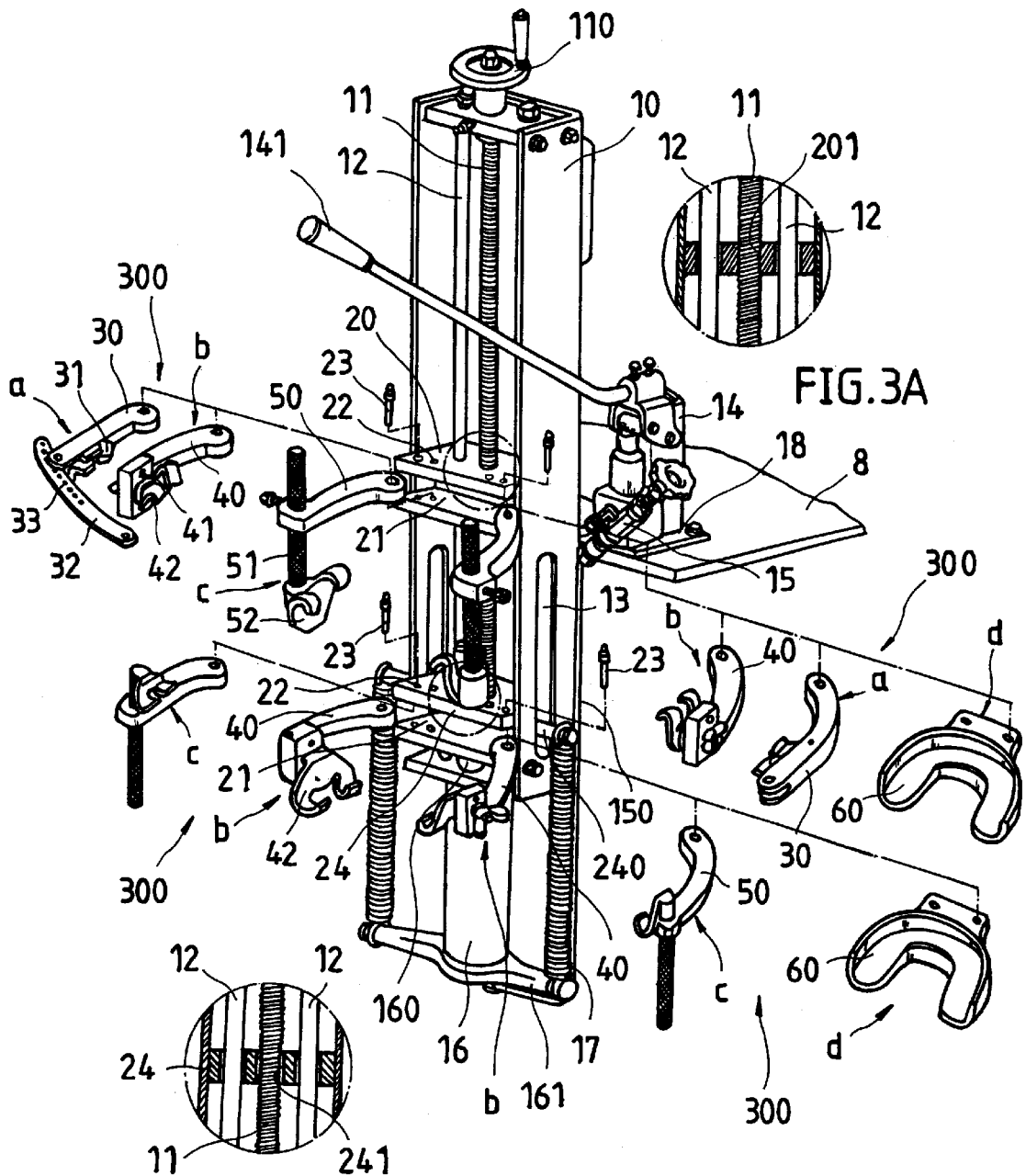
FIG. 3 is an exploded view of the present invention.
FIG. 3A is an enlarged view of a part of FIG. 3 showing the top carrier coupled to the rails and the screw rod.
FIG. 3B is an enlarged view of a part of FIG. 3 showing the bottom carrier coupled to the rails and the screw rod.
Figure 10:
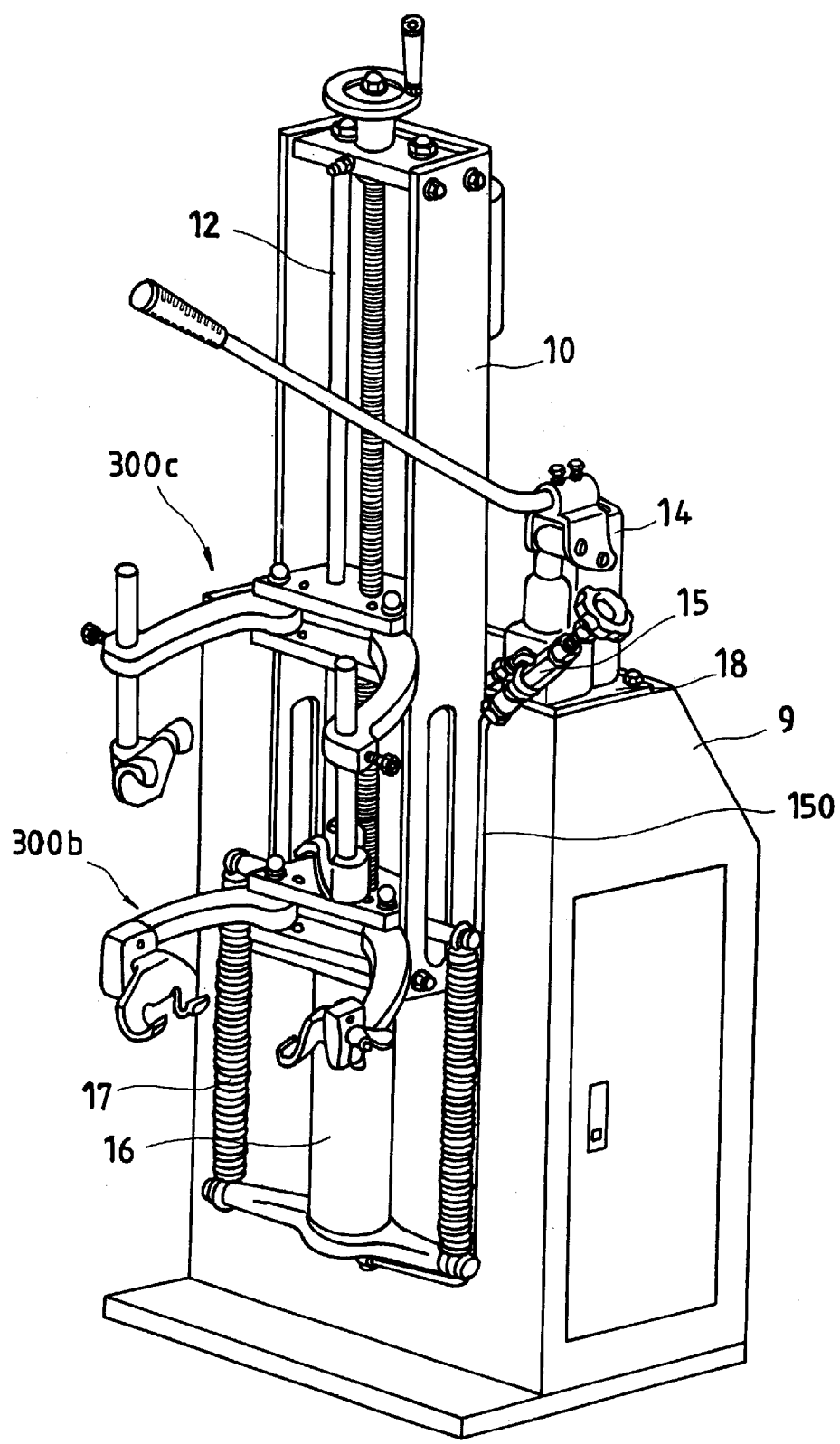
FIG. 10 is perspective view of the present invention, showing the back mounting board of the base frame fastened to a storage box.

Referring to FIG. 10 and FIG. 3 again, the base frame 10 comprises a back mounting board 18 adapted for fastening to a support frame 8 (see FIG. 3), or a storage box 9 (see FIG. 10). The aforesaid hand pump 14 is installed in the back mounting board 18.

It is to be understood that the drawings are designed for purposes of illustration only, and are not intended for use as a definition of the limits and scope of the invention disclosed.

What the invention claimed is:

1. An adjustable shock-absorber mounting structure comprising:
   a base frame, the base frame having two longitudinal sliding slots aligned at two opposite vertical side walls thereof;

two parallel rails longitudinally mounted in said base frame, a screw rod longitudinally mounted in said base frame between said rails;

a hand wheel fixedly fastened to said screw rod above said base frame and adapted to rotate said screw rod in said base frame;

an upper carrier mounted in said base frame and adapted to move along said rails upon rotation of said screw rod, said upper carrier having a center screw hole, which receives said screw rod;

a bottom carrier mounted in said base frame and adapted to move along said rails below said upper carrier, said bottom carrier having a center through hole for the passing of said screw rod and two rod members horizontally extended from two opposite lateral sides thereof and respectively inserted through the sliding slots of said base frame;

a hydraulic cylinder spaced below said base frame, said hydraulic cylinder having a bottom shelf and a reciprocating rod fixedly connected to said bottom carrier and adapted to move said bottom carrier along said rails relative to said upper carrier;

two return springs bilaterally connected between two distal ends of the bottom shelf of said hydraulic cylinder and the rod members of said bottom carrier to impart a downward pressure to said bottom carrier toward said hydraulic cylinder;

an oil pipe connected to said hydraulic cylinder, a relief valve installed in said oil pipe and controlled to release air from said oil pipe for enabling hydraulic oil to flow from said hydraulic cylinder to said oil pipe; and a hand pump connected to one end of said oil pipe remote from said hydraulic cylinder and adapted to pump hydraulic oil from said oil pipe to said hydraulic cylinder, and shock-absorber holder means selectively installed in said upper carrier and said bottom carrier and adapted to hold a shock-absorber, said shock-absorber holder means selected from a combination of a group consisting of at least one first shock-absorber holder, at least one second shock-absorber holder, at least one third shock-absorber holder, and at least one fourth shock-absorber holder, said at least one first shock-absorber holder comprising an arched connecting plate, said arched connecting plate having a longitudinal series of mounting holes, and two arms selectively connected to the mounting holes of said arched connecting plate and adapted for fastening to said upper carrier or said bottom carrier, the arms of said at least one first shock-absorber holder each comprising a plurality of hooked lugs disposed at an inner side near and adapted to hold a shock-absorber, said at least one second shock-absorber holder comprising two arms adapted for fastening to said upper carrier or said bottom carrier and two swivel catch pawls selectively fastened to vertically spaced mounting holes at each of the arms of the corresponding second shock-absorber holder and locked by respective lock means, said at least one third shock-absorber holder comprising two arms each having a rear end fastened to said upper carrier or said bottom carrier and a front end, two stems vertically adjustably fastened to the front end of the arms of the corresponding third shock-absorber holder and fixed at the desired elevation by tightening means, and two catch pawls respectively mounted on the stems of the corresponding third shock-absorber holder, said at least one fourth shock-absorber holder comprised of a U-shaped catch pawl and adapted for fastening to said upper carrier or said bottom carrier.

2. The adjustable shock-absorber mounting structure of claim 1 wherein said base frame comprises a back mounting board for mounting.

* * * * *